(12) United States Patent
Muraoka et al.

(10) Patent No.: US 12,070,719 B2
(45) Date of Patent: Aug. 27, 2024

(54) GAS PROCESSING EQUIPMENT AND GAS PROCESSING METHOD, AND CARBON DIOXIDE CAPTURE SYSTEM AND CARBON DIOXIDE CAPTURE METHOD

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Daigo Muraoka, Kawasaki Kanagawa (JP); Koshito Fujita, Yokohama Kanagawa (JP); Shinji Murai, Sagamihara Kanagawa (JP); Hayato Morigaki, Yokohama Kanagawa (JP); Osamu Shibasaki, Yokohama Kanagawa (JP); Yasuhiro Kato, Tokyo (JP); Satoshi Saito, Yamato Kanagawa (JP); Takehiko Muramatsu, Yokohama Kanagawa (JP); Ryosuke Shibata, Yokohama Kanagawa (JP); Yusuke Handa, Tokyo (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 137 days.

(21) Appl. No.: 17/695,157

(22) Filed: Mar. 15, 2022

(65) Prior Publication Data
US 2022/0314161 A1    Oct. 6, 2022

(30) Foreign Application Priority Data

Apr. 2, 2021 (JP) .................................. 2021-063626
Feb. 17, 2022 (JP) .................................. 2022-023271

(51) Int. Cl.
*B01D 53/14* (2006.01)
*B01D 53/30* (2006.01)
(Continued)

(52) U.S. Cl.
CPC ..... *B01D 53/1475* (2013.01); *B01D 53/1425* (2013.01); *B01D 53/30* (2013.01);
(Continued)

(58) Field of Classification Search
CPC ........ Y02A 50/00; Y02A 50/20; Y02C 20/00; Y02C 20/40
See application file for complete search history.

(56) References Cited

U.S. PATENT DOCUMENTS 6,174,506 B1    1/2001    Chakravarti et al.
6,883,327 B2    4/2005    Iijima et al.
(Continued)

FOREIGN PATENT DOCUMENTS

JP    4274846 B2    6/2009
JP    2010-5509 A    1/2010
(Continued)

OTHER PUBLICATIONS

Machine translation of WO 2014/175478 A1, published on Oct. 30, 2014 (Year: 2014).*

*Primary Examiner* — Natasha E Young
(74) *Attorney, Agent, or Firm* — Foley & Lardner LLP (57) ABSTRACT

According to one embodiment, a gas processing equipment includes an oxygen remover 2 that removes oxygen contained in exhaust gas G, and a gas processing device 3 that processes pretreated exhaust gas G (P), from which the oxygen has been removed by the oxygen remover 2, with a carbon dioxide absorbent solvent S as a treatment agent.

19 Claims, 8 Drawing Sheets

(51) Int. Cl.
  *B01D 53/34*  (2006.01)
  *B01D 53/46*  (2006.01)
  *B01D 53/76*  (2006.01)
  *B01D 53/81*  (2006.01)
  *B01D 53/86*  (2006.01)

(52) U.S. Cl.
  CPC ........... *B01D 53/346* (2013.01); *B01D 53/46* (2013.01); *B01D 53/76* (2013.01); *B01D 53/81* (2013.01); *B01D 53/8671* (2013.01); *B01D 2252/10* (2013.01); *B01D 2252/204* (2013.01); *B01D 2252/30* (2013.01); *B01D 2257/104* (2013.01); *B01D 2257/504* (2013.01)

(56) References Cited

U.S. PATENT DOCUMENTS

| | | | |
|---|---|---|---|
| 8,926,919 B2 * | 1/2015 | Ogawa | B01D 53/1475 |
| | | | 423/220 |
| 2017/0348638 A1 | 12/2017 | Neumayer et al. | |
| 2017/0368495 A1 * | 12/2017 | Mabrouk | B01D 53/1493 |
| 2018/0221817 A1 * | 8/2018 | Prasad | C12M 47/18 |

FOREIGN PATENT DOCUMENTS

| | | | | |
|---|---|---|---|---|
| JP | 2010-069371 A | 4/2010 | | |
| JP | 2011-115709 A | 6/2011 | | |
| WO | WO-2014175478 A1 * | 10/2014 | ......... | B01D 53/1431 |
| WO | WO-2015/064793 A1 | 5/2015 | | |

* cited by examiner

GAS PROCESSING EQUIPMENT AND GAS PROCESSING METHOD, AND CARBON DIOXIDE CAPTURE SYSTEM AND CARBON DIOXIDE CAPTURE METHOD

FIELD

Embodiments described herein relate to a gas processing equipment and a gas processing method, and a carbon dioxide capture system and a carbon dioxide capture method.

CROSS-REFERENCE TO RELATED APPLICATIONS

This application is based upon and claims the benefit of priority from Japanese Patent Application No. 2021-63626, filed Apr. 2, 2021 and Japanese Patent Application No. 2022-23271, filed Feb. 17, 2022, the entire contents of which are incorporated herein by reference.

BACKGROUND

A carbon dioxide capture and storage (CCS) technology has been paid attention as an effective measure against the global warming problem. In particular, the use of a CCS facility for a medium (thermal power plant, steel mill, cement plant, etc.) that generates a large amount of carbon dioxide gas is being studied worldwide.

One of the CCS technologies is a chemical absorption method that brings exhaust gas containing carbon dioxide and an absorbent solvent into contact with each other to separate and capture the carbon dioxide. The absorbent solvent used in this method is, for example, a silicone oil, an amine solution, an ionic solution, etc.

Components contained in exhaust gas vary depending on a medium that discharges the exhaust gas and/or a raw material generating the exhaust gas. However, many types of exhaust gases commonly contain nitrogen gas and oxygen gas as components other than carbon dioxide.

When exhaust gas containing oxygen gas is introduced to a CCS facility, the oxygen gas is also absorbed in an absorbent solvent in the step of separating carbon dioxide. The oxygen gas absorbed in the absorbent solvent causes an absorption reaction of the oxygen gas in the absorbent solvent, so that the absorbent solvent may be oxidized (decomposed). Such oxidation (decomposition) may reduce a component concentration of the absorbent solvent. Such oxidation (decomposition) may deteriorate performance of the absorbent solvent to absorb carbon dioxide gas. As a result, there is a possibility that the carbon dioxide gas cannot be separated and captured in a desired condition.

When oxygen gas absorbed in the absorbent solvent is also entrained, oxygen will be mixed in carbon dioxide as a final product to be captured. This case may also lower a purity of the carbon dioxide, resulting in quality loss.

The inventors conducted a test in which an absorbent solvent was repeatedly brought into contact with a carbon dioxide containing gas, which was free of oxygen gas and was rich in nitrogen gas, and a test in which an absorbent solvent was repeatedly brought into contact with a carbon dioxide containing gas which was rich in oxygen gas. The inventors confirmed that the absorbent solvent did not decompose in the former test, and that the absorbent solvent decomposed in the latter test. It was also found that a degree of decomposition depended on a partial pressure of oxygen.

Thus, the object of the embodiments described herebelow is to provide a gas processing equipment and a gas processing method, and a carbon dioxide capture system and a carbon dioxide capture method, which are capable of suppressing mixture of oxygen to a treatment agent (absorbent solvent, etc.) that performs a treatment such as separation of carbon dioxide from exhaust gas, to thereby maintain suitable performance of the treatment agent.

DETAILED DESCRIPTION

In one embodiment, a gas processing equipment comprises: an oxygen remover that removes oxygen contained in exhaust gas; and a gas processing device that processes pretreated exhaust gas, from which the oxygen has been removed by the oxygen remover, with a treatment agent.

In one embodiment, a gas processing method comprises: an oxygen removal step that removes oxygen contained in exhaust gas; and a gas processing step that processes pretreated exhaust gas, from which the oxygen has been removed by the oxygen removal step, with a treatment agent.

In one embodiment, a carbon dioxide capture system comprises: an oxygen remover that removes oxygen contained in exhaust gas; an absorber that separates carbon dioxide from pretreated exhaust gas, from which the oxygen has been removed by the oxygen remover, by bringing a carbon dioxide absorbent solvent and the pretreated exhaust gas into contact with each other so that the carbon dioxide contained in the pretreated exhaust gas is absorbed in the carbon dioxide absorbent solvent; and a regenerator that diffuses the carbon dioxide from the carbon dioxide absorbent solvent discharged from the absorber, and discharges the carbon dioxide absorbent solvent, which has diffused the carbon dioxide, and a regenerator discharged gas containing the carbon dioxide.

In one embodiment, a carbon dioxide capture method comprises: an oxygen removal step that removes oxygen contained in exhaust gas; and an absorption step that separates carbon dioxide from pretreated exhaust gas, from which the oxygen has been removed by the oxygen removal step, by bringing a carbon dioxide absorbent solvent and the pretreated exhaust gas into contact with each other so that the carbon dioxide contained in the pretreated exhaust gas is absorbed in the carbon dioxide absorbent solvent; and a regeneration step that diffuses the carbon dioxide from the carbon dioxide absorbent solvent that has absorbed the carbon dioxide in the absorption step, and discharges the carbon dioxide absorbent solvent, which has diffused the carbon dioxide, and a regenerator discharged gas containing the carbon dioxide.

The respective embodiments will be described in detail hereunder with reference to the attached drawings.

First Embodiment

Figure 1:
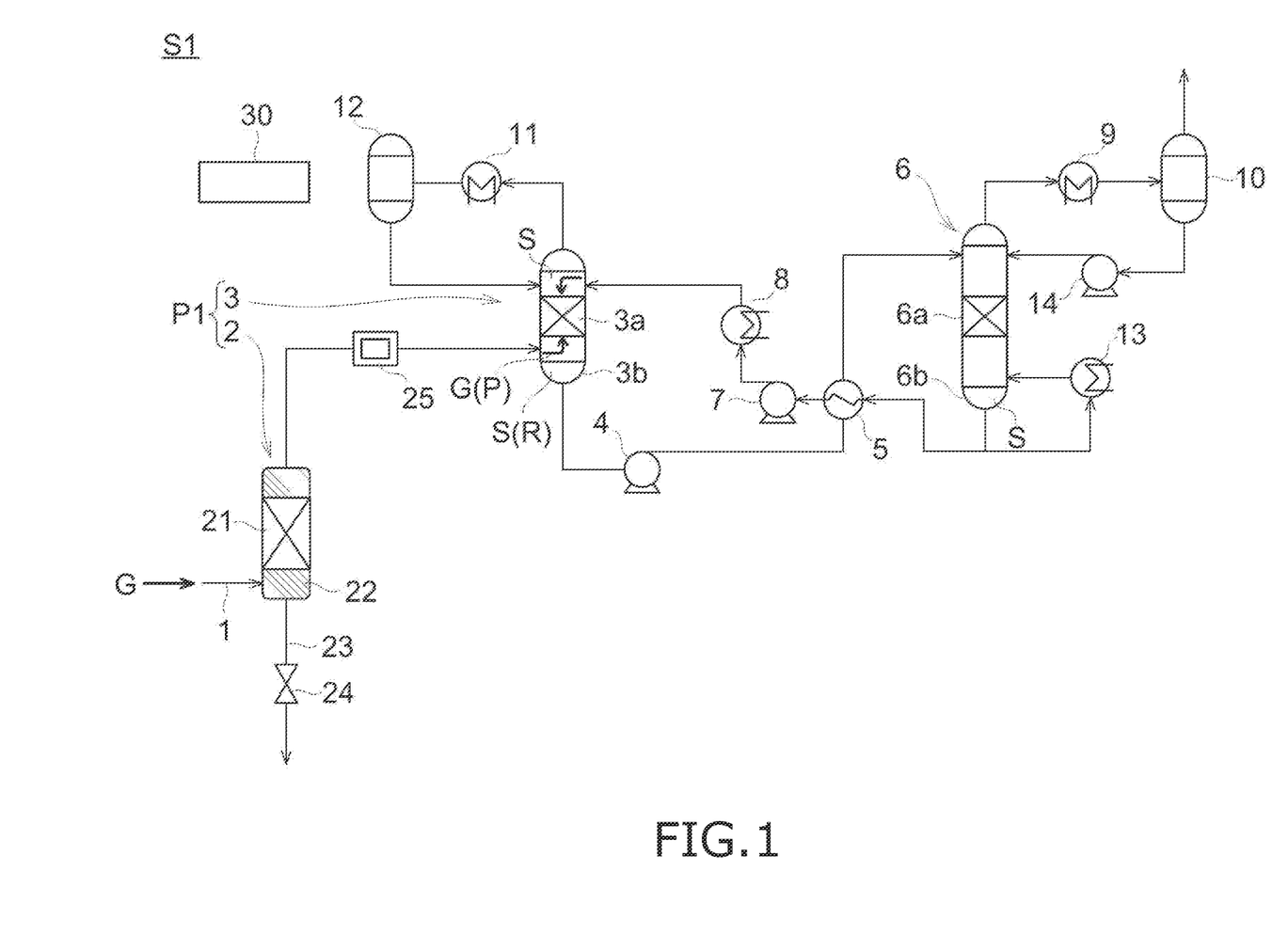
FIG. 1 is a view showing a carbon dioxide capture system according to a first embodiment.

FIG. 1 is a view showing a carbon dioxide capture system S1 according to a first embodiment.

<Carbon Dioxide Capture System>

A schematic structure of the carbon dioxide capture system S1 is described first.

The carbon dioxide capture system S1 shown in FIG. 1 comprises an exhaust gas line 1, an oxygen remover 2, an absorber 3, a rich liquid transfer pump 4, a regenerative heat exchanger 5, a regenerator 6, a lean liquid transfer pump 7, a lean liquid cooler 8, a regenerator outlet cooler 9, a regenerator outlet separator 10, an absorber outlet cooler 11, an absorber outlet separator 12, and a controller 30.

The exhaust gas line 1 is a flow path that introduces exhaust gas G, such as combustion exhaust gas, which is discharged from a not-shown exhaust gas discharge facility, to the absorber 3 through the oxygen remover 2. The exhaust gas discharge facility may be, for example, a combustion facility of a power plant such as a coal-fired power plant, a factory such as a steel mill or a cleaning plant, a waste incineration plant, or a manufacturing facility and so on.

The oxygen remover 2 removes oxygen from the exhaust gas G supplied from the exhaust gas line 1, and sends to the absorber 3 a pretreated exhaust gas G (P) from which oxygen has been removed. In detail, the oxygen remover 2 reduces an oxygen concentration by removing oxygen from the exhaust gas, but it does not necessarily have to reduce the oxygen concentration in the exhaust gas. A detailed structure of the oxygen remover 2 is described later.

The absorber 3 brings the pretreated exhaust gas G (P) having passed through the oxygen remover 2 and a carbon dioxide absorbent solvent S as a treatment agent into gas-liquid contact with each other, so that carbon dioxide is absorbed in the carbon dioxide absorbent solvent S. In this manner, the absorber 3 separates the carbon dioxide from the pretreated exhaust gas G (P).

The absorber 3 in FIG. 1 is constituted by a counter-flow gas-liquid contactor of a packed section type, for example, and has a packed section 3a and a liquid reservoir part 3b located therebelow. The absorber 3 has a gas inlet for introducing the pretreated exhaust gas G (P), which is located below the packed section 3a, and has an absorbent liquid inlet for introducing the carbon dioxide absorbent solvent S, which is located above the packed section 3a. The carbon dioxide solvent S is a lean solvent.

The carbon dioxide absorbent solvent S introduced from the absorbent liquid inlet falls down to the packed section 3a, while the pretreated exhaust gas G (P) introduced from the gas inlet moves upward to the packed section 3a. In this example, the carbon dioxide absorbent solvent S and the pretreated exhaust gas G (P) come into gas-liquid contact with each other in the packed section 3a, so that the carbon dioxide absorbent solvent S, which has absorbed carbon dioxide and becomes a rich solvent, falls down from the packed section 3a to be received in the liquid reservoir part 3b. In the following description and FIG. 1, the carbon dioxide absorbent solvent S which corresponds to the rich solvent is shown by a reference numeral S (R) for the convenience of description.

On the other hand, the absorber discharged gas containing the pretreated exhaust gas G (P) from which the carbon dioxide has been separated, moves upward from the packed section 3a to be discharged (emitted) outside from a top of the absorber 3.

In this embodiment, as described above, the absorber discharged gas which discharged from the absorber 3 is cooled by the absorber outlet cooler 11, and is thereafter introduced to the absorber outlet separator 12. At this time, the absorber outlet cooler 11 cools the absorber discharged gas to partially condense the absorber discharged gas. Then, the absorber outlet cooler 11 sends condensed water(liquid) and the absorber discharged gas which is still gaseous (gaseous absorber discharged gas), to the absorber outlet separator 12. Then, in this example, the absorber outlet separator 12 returns the condensed water, which contains a large amount of carbon dioxide absorbent solvent S, to the absorber 3, in order for the gas-liquid contact with the pretreated exhaust gas G (P).

On the other hand, the absorber outlet separator 12 discharges outside the gaseous absorber discharged gas. At this time, the absorber discharged gas may be cleaned with a cleaning liquid and may then be discharged. However, the aforementioned absorber outlet cooler 11 and the absorber outlet separator 12 may be omitted. In this case, the absorber discharged gas to be discharged from the absorber 3 may be discharged directly outside.

The carbon dioxide absorbent solvent S used in this system S1 is, for example, a solvent containing at least one of an amine solution (solvent), a silicone oil, or an ionic liquid, and may contain an additive according to need. An amine solution contains one or more amines. Examples of amines are monoethanolamine, diethanolamine, etc.

Although the absorber 3 shown in FIG. 1 is of a packed section type, it may be of a shelf type, a wet scrubber type, etc.

The rich liquid transfer pump 4 transfers the carbon dioxide absorbent solvent S (R), which is a rich solvent pooled in the liquid reservoir part 3b of the absorber 3, from an absorbent liquid outlet provided on a bottom of the absorber 3, to the regenerator 6 through the regenerative heat exchanger 5. During this transfer, the carbon dioxide absorbent solvent S (R) moving from the absorber 3 to the regenerator 6 is heated by the heat exchange in the regenerative heat exchanger 5.

The regenerator 6 diffuses carbon dioxide from the carbon dioxide absorbent solvent S (R), which is a rich solvent discharged from the absorber 3, and regenerates the carbon dioxide absorbent solvent S (R) which is a rich solvent, into the carbon dioxide absorbent solvent S which is a lean solvent. Then, the regenerator 6 discharges the carbon dioxide absorbent solvent S which is a lean solvent, and a regenerator discharged gas containing the diffused carbon dioxide.

The regenerator 6 in FIG. 1 is formed by a counter-flow gas-liquid contactor of a packed section type, for example, and has a packed section 6a and a liquid reservoir part 6b located therebelow. The regenerator 6 has an absorbent liquid inlet for introducing the carbon dioxide absorbent solvent S (R) discharged from the absorber 3, which is located above the packed section 6a. The carbon dioxide absorbent solvent S (R) is a rich solvent.

The regenerator 6 diffuses most of carbon dioxide together with steam from the carbon dioxide absorbent solvent S (R) to separate the carbon dioxide from the carbon dioxide absorbent solvent S (R), by heating the absorbent liquid introduced from the absorbent liquid inlet.

In detail, the regenerator 6 comprises a reboiler 13 and heats the carbon dioxide absorbent solvent S (R) by performing heat exchange between a high temperature steam supplied from the reboiler 13 and the carbon dioxide absorbent solvent S (R). The carbon dioxide absorbent solvent S (R), which is not separated by the heating and thus passes through the packed section 6a, falls down to the liquid reservoir part 6b. Thus, the carbon dioxide absorbent solvent S, which is a lean solvent having diffused the carbon dioxide, is pooled in the liquid reservoir part 6b.

The carbon dioxide absorbent solvent S pooled in the liquid reservoir part 6b at the bottom of the regenerator 6 as described above is returned by the lean liquid transfer pump 7 to the absorber 3 through the regenerative heat exchanger 5 and the lean liquid cooler 8. At this time, the carbon dioxide absorbent solvent S moving from the regenerator 6 to the absorber 3 is cooled by the heat exchange in the regenerative heat exchanger 5 and a cooling action in the lean liquid cooler 8. In the regenerative heat exchanger 5, the carbon dioxide absorbent solvent S (R) moving from the absorber 3 to the regenerator 6 is heat exchanged with the carbon dioxide absorbent solvent S moving from the regenerator 6 to the absorber 3.

The regenerator 6 comprises the packed section 6a and the liquid reservoir part 6b. Instead thereof, the regenerator 6 may be of a flash drum (flash tank) type, which heats the carbon dioxide absorbent solvent S (R) in a tank to diffuse carbon dioxide together with stem. In this case, the regenerator 6 may comprise, e.g., an electric heater as a heater for heating the carbon dioxide absorbent solvent S (R).

On the other hand, the regenerator discharged gas, which contains carbon dioxide and steam diffused from the carbon dioxide absorbent solvent S (R) in the regenerator 6, is discharged from a gas outlet provided on a top of the regenerator 6, and is sent to the regenerator outlet cooler 9.

The regenerator outlet cooler 9 cools the regenerator discharged gas to partially condense the regenerator discharged gas to separate the regenerator discharged gas into condensed water and the regenerator discharged gas which is still gaseous. The condensed water contains a carbon dioxide absorbent solvent component, while the gaseous regenerator discharged gas mainly contains carbon dioxide. Then, the condensed water and the regenerator discharged gas are transferred to the regenerator outlet separator 10.

The regenerator outlet separator 10 receives the condensed water and the regenerator discharged gas from the regenerator outlet cooler 9. The regenerator outlet separator 10 cleans the cooled regenerator discharged gas with a cleaning liquid to remove impurities such as a carbon dioxide absorbent solvent component, etc., contained in the regenerator discharged gas, and discharges the cleaned regenerator discharged gas. The cleaning liquid is not particularly limited, and may be water, for example.

The regenerator discharged gas from which impurities have been removed by cleaning becomes highly pure carbon dioxide, and is discharged from the regenerator outlet separator 10. The carbon dioxide discharged from the regenerator outlet separator 10 may be converted to a desired state, such as a supercritical state, a liquid state, etc., by a compression pump, and may be stored in a tank or transported by a lorry or a pipeline, etc.

On the other hand, the regenerator outlet separator 10 in this embodiment transfers the condensed water containing the carbon dioxide absorbent solvent component received from the regenerator outlet cooler 9 and the cleaning liquid having been used for the cleaning, from an outlet at a bottom of the regenerator outlet separator 10 to the regenerator 6 by a separator condensed water transfer pump 14. The condensed water containing the carbon dioxide absorbent solvent component and the cleaning liquid having been used for the cleaning, which have been transferred to the regenerator 6, are heated by the regenerator 6, so that carbon dioxide is separated from them.

The controller 30 controls various operations of the carbon dioxide capture system S1. Examples of the controller 30 are a processor, an electric circuit, a computer, etc. The controller 30 controls, for example, the rotation speeds of the rich liquid transfer pump 4 and the lean liquid transfer pump 7, the cooling operations of the lean liquid cooler 8, the regenerator outlet cooler 9 and the absorber outlet cooler 11, the heating operation of the reboiler 13, etc.

In addition, the controller 30 in this embodiment is electrically connected to a below-described oxygen concentration detector 25, which is provided downstream of the oxygen remover 2, and also performs a predetermined control based on a detection result of the oxygen concentration detector 25.

<Oxygen Remover>

The oxygen remover 2 is described in detail below.

As show in FIG. 1, the oxygen remover 2 in this embodiment has a remover part 21 detachably housed therein, and a liquid reservoir part 22 located below the remover part 21. The oxygen remover 2 has a gas inlet for introducing the exhaust gas G, which is located below the remover part 21, and has a gas outlet for discharging the exhaust gas G (pretreated exhaust gas G (P)) having passed through the remover part 21, which is located above, in particular, at a top of the remover part 21.

The oxygen remover 2 removes oxygen from the exhaust gas G and reduces an oxygen concentration in the exhaust gas G, by passing the exhaust gas G introduced from the gas inlet through the remover part 21. In detail, the remover part 21 in this embodiment has a non-liquid deoxidizer which adsorbs oxygen contained in the exhaust gas G to remove the oxygen.

The deoxidizer to be employed may contain at least one of iron, copper, lead, silver, zeolite, or activated carbon. The deoxidizer may have a granular shape (aggregation of grains), a honeycomb shape, a porous shape, or a combination of at least two of these shapes. In particular, when iron particles are used as the deoxidizer, they can effectively and efficiently remove oxygen because of their significantly high affinity to oxygen and advantage in terms of cost.

The shape of the deoxidizer may be of another type, as long as a pressure loss when exhaust gas is introduced into the oxygen remover 2 can be ensured within an appropriate range. The remover part 21 in this embodiment is detachable from the oxygen remover 2. In addition, the remover part 21 may be configured such that the deoxidizer is replaceable.

When the exhaust gas G is caused to pass through the remover part 21, part of the exhaust gas G may condense and condensed water may pool in the liquid reservoir part 21. In this embodiment, a discharge pipe 23 is connected to a bottom of the oxygen remover 2. Thus, by opening an open/close valve 24 on the discharge pipe 23, the pooled condensed water can be discharged outside. The open/close valve 24 may be controlled by the controller 30 or may be manually operated.

The aforementioned oxygen concentration detector 25, which detects an oxygen concentration in the pretreated exhaust gas G (P), is provided on a flow path between the oxygen remover 2 and the absorber 3, through which the pretreated exhaust gas G (P) discharged from the oxygen remover 2 flows. The controller 30 obtains information of an oxygen concentration in the pretreated exhaust gas G (P), which is detected by the oxygen concentration detector 25.

The controller 30 is configured to make a message that suggests replacement of the remover part 21, when the oxygen concentration in the pretreated exhaust gas G (P), which is detected by the oxygen concentration detector 25, is equal to or more than a predetermined value. The message is not limited to any particular type. For example, the massage may be displayed on a monitor, the massage may be a warning light, a warning sound may be issued, etc.

In this embodiment, the oxygen remover 2 and the absorber 3 as a gas processing device constitute a gas processing equipment P1. This embodiment shows an example in which the gas processing equipment P1 is incorporated in the carbon dioxide capture system, but the gas processing equipment P1 can be applied to any other exhaust gas processing equipment different from the carbon dioxide capture system.

In addition, in this embodiment, the remover part 21 of the oxygen remover 2 is a non-liquid deoxidizer. In this structure, it is preferable to operate the oxygen remover 2 at a high temperature. Thus, the remover part 21 is preferably provided at the most upstream position in the carbon dioxide capture system S1. A heat exchanger for cooling exhaust gas may be provided upstream of the absorber 3. In this case, the oxygen remover 2 is preferably provided upstream of the heat exchanger.

<Operation>

Next, an operation of the aforementioned carbon dioxide capture system S1 is described with reference to FIG. 1.

Exhaust gas G to be introduced to the carbon dioxide capture system S1 firstly flows into the oxygen remover 2. Here, the oxygen remover 2 removes oxygen contained in the exhaust gas G by passing the exhaust gas G through (bringing the exhaust gas G into contact with) the remover part 21 (oxygen removal step). Then, pretreated exhaust gas G (P) discharged from the oxygen remover 2 is sent to the absorber 3. On the way to the absorber 3, an oxidation concentration of the pretreated exhaust gas G (P) is detected by the oxygen connection detector 25. Detected information is transmitted to the controller 30.

Then, the pretreated exhaust gas G (P) discharged from the oxygen remover 2 flows into the absorber 3. The absorber 3 processes the pretreated exhaust gas G (P) with a carbon dioxide absorbent solvent S as a treatment agent (gas processing step, absorption step). In detail, the oxygen remover 2 separates carbon dioxide from the pretreated exhaust gas G (P) by bringing the carbon dioxide absorbent solvent S and the pretreated exhaust gas G (P) into contact with each other so that the carbon dioxide contained in the pretreated exhaust gas G (P) is absorbed in the carbon dioxide absorbent solvent S.

Then, the carbon dioxide absorbent solvent S (R), which is a rich solvent having absorbed the carbon dioxide in the absorber 3, is sent from the absorber 3 to the regenerator 6. On the other hand, the absorber discharged gas, which contains the pretreated exhaust gas G (P) from which the carbon dioxide has been separated, is discharged (emitted) outside from the top of the absorber 3.

Then, the regenerator 6 diffuses the carbon dioxide from the carbon dioxide absorbent solvent S (R) received therein, and discharges the carbon dioxide absorbent solvent S which has diffused the carbon dioxide, and the regenerator discharged gas containing the carbon dioxide (regeneration step). At this time, due to the diffusion of the carbon dioxide from the carbon dioxide absorbent solvent S (R), the carbon dioxide absorbent solvent S (R) is regenerated into the carbon dioxide absorbent solvent S.

Then, the regenerated carbon dioxide absorbent solvent S, which is a lean solvent as a treatment agent discharged from the regeneration 6, is sent to the absorber 3, and is again used repeatedly for a carbon dioxide separation treatment.

In the aforementioned series of processes, when it is detected that an oxygen concentration in the pretreated exhaust gas G (P), which is detected by the oxygen concentration detector 25, is equal to or higher than a predetermined value, the controller 30 makes a message that suggests replacement of the remover part 21.

When the message is made, a manager (user) of the carbon dioxide capture system S1 may replace the remover part 21. Such a replacement operation may be carried out, for example, by temporarily stopping the introduction of the exhaust gas G, and by replacing the remover part 21 in use with a new one.

In the aforementioned carbon dioxide capture system S1, when oxygen contained in the exhaust gas G gets mixed in with the carbon dioxide absorbent solvent S, there is a possibility that the carbon dioxide absorbent solvent S is oxidized (decomposed), inviting deterioration of the carbon dioxide absorption performance. When the carbon dioxide absorbent solvent S with oxide being mixed therein is continuously used, the carbon dioxide absorption performance may further deteriorate. Thus, an adverse effect of oxidation of the carbon dioxide absorbent solvent S repeatedly used in the absorber 3 on the carbon dioxide capture system S1 may increase over time.

To avoid this risk, in the carbon dioxide capture system S1 according to this embodiment, the oxygen remover 2 is provided upstream of the absorber 3 in order that oxygen contained in exhaust gas G is removed before the exhaust gas G flows into the absorber 3 where the carbon dioxide absorbent solvent S is repeatedly used. Then, pretreated exhaust gas G (P) from which oxygen has been removed by the oxygen remover 2 flows into the absorber 3.

As a result, this embodiment can suppress mixture of oxygen into the carbon dioxide absorbent solvent S which is a treatment agent that performs processing of separating carbon dioxide from exhaust gas, and thus can well maintain the performance of the carbon dioxide absorbent solvent S. Namely, since the mixture of oxygen into the carbon dioxide absorbent solvent S is suppressed so that there is no or little possibility that oxidative decomposition occurs, the performance of the carbon dioxide absorbent solvent S can be well maintained.

In addition, when the carbon dioxide absorbent solvent S (R), which is a rich solvent having absorbed the carbon dioxide, has been transferred to the regenerator 6 and then the carbon dioxide is diffused in the regenerator 6, entrainment of oxygen with the diffused carbon dioxide is suppressed. Thus, purity of the carbon dioxide (product $CO_2$) which is discharged from the regenerator 6 and is then discharged through the regenerator outlet separator 10 can be increased, resulting in improved product quality.

In this embodiment, an oxygen concentration in the pretreated exhaust gas G (P) is detected by the oxygen concentration detector 25, before the pretreated exhaust gas G (P) flows into the absorber 3. Since the condition of the oxygen remover 2 can be monitored, a replacement operation can be replaced in response to its performance deterioration, for example. This can more effectively suppress mixture of oxygen into the carbon dioxide absorbent solvent S.

The oxygen remover 2 has the detachable remover part 21. In this case, the oxygen remover 2 can be easily fabricated. When the oxygen remover 2 is small because of the small carbon dioxide capture system S1, a replacement operation can be facilitated, resulting in improved usability.

Second Embodiment

Figure 2:
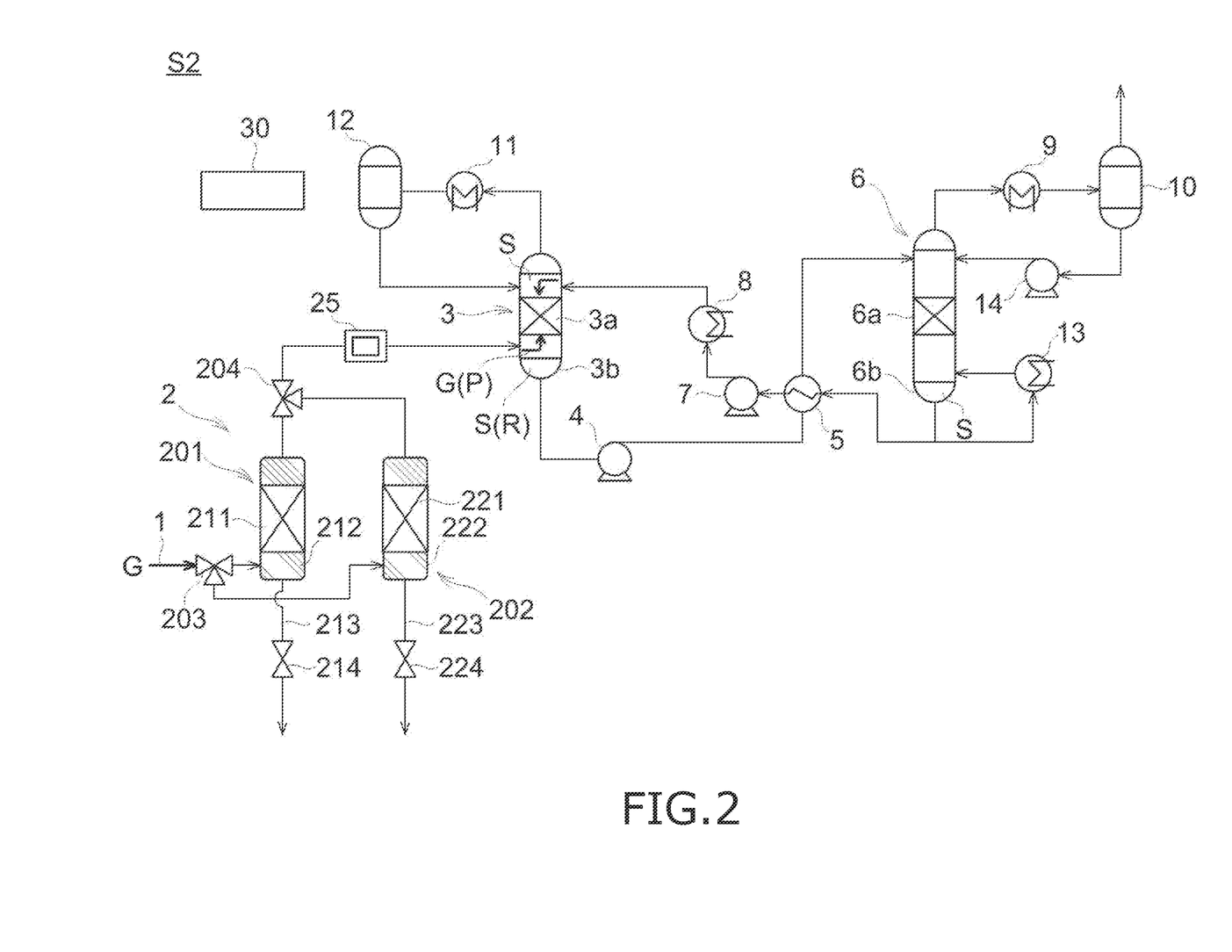
FIG. 2 is a view showing a carbon dioxide capture system according to a second embodiment.

Next, a carbon dioxide capture system S2 according to a second embodiment is described with reference to FIG. 2.

The same reference numeral is given to a constituent element similar to that of the first embodiment, and its description is omitted. Only difference from the first embodiment is described hereunder.

An oxygen remover 2 according to this embodiment differs from that of the first embodiment in that it includes a plurality of oxygen removers 201, 202. Specifically, the oxygen remover 2 in FIG. 2 comprises a first oxygen remover 201 and a second oxygen remover 202.

Each oxygen remover 201, 202 basically has the same structure as the oxygen remover 2 shown in the first embodiment. Namely, the first oxygen remover 201 has a first remover part 211 detachably housed therein, and a liquid reservoir part 212 located below the first remover part 211. The second oxygen remover 202 has a second remover part 221 detachably housed therein, and a liquid reservoir part 222 located below the second remover part 221. The first remover part 211 and the second remover part 221 each have a non-liquid deoxidizer which absorbs oxygen contained in the exhaust gas G to remove the oxygen.

The first oxygen remover 201 has a gas inlet for introducing exhaust gas G, which is located below the first remover part 211, and has a gas outlet for discharging the exhaust gas G (pretreated exhaust gas G (P)) having passed through the first remover part 211, which is located above, in particular, at a top of the first remover part 211. The second oxygen remover 202 has a gas inlet for introducing the exhaust gas G, which is located below the second remover part 221, and has a gas outlet for discharging the exhaust gas G (pretreated exhaust gas G (P)) having passed through the second remover part 221, which is located above, in particular, at a top of the second remover part 221.

A first discharge pipe 213 is connected to a bottom of the first oxygen remover 201. By opening an open/close valve 214 on the discharge pipe 213, condensed water pooled in the bottom of the first remover 201 can be discharged outside. Similarly, a second discharge pipe 223 is also connected to a bottom of the second oxygen remover 202. By opening a second open/close valve 224 on the second discharge pipe 223, condensed water pooled in the bottom of the second oxygen remover 202 can be discharged outside.

The first oxygen remover 201 and the second oxygen remover 202 introduce exhaust gas G through a supply-side three-way valve 203.

The supply-side three-way valve 203 is configured to receive the exhaust gas G from an inlet port, and to supply the exhaust gas G from a first outlet port to the first oxygen remover 201, as well as to supply the exhaust gas G from a second outlet port to the second oxygen remover 202. In this embodiment, a controller 30 controls the supply-side three-way valve 203 such that a condition in which the exhaust gas G received by the inlet port of the supply-side three-way valve 203 is supplied from the first outlet port to the first oxygen remover 201 is switched to a condition in which the exhaust gas G received by the inlet port of the supply-side three-way valve 203 is supplied from the second outlet port to the second oxygen remover 202, and vive versa.

The first oxygen remover 201 and the second oxygen remover 202 send pretreated exhaust gas G (P) to the absorber 3 through a discharge-side three-way valve 204.

The discharge-side three-way valve 204 sends the pretreated exhaust gas G (P) received by a first inlet port from the first oxygen remover 201, or the pretreated exhaust gas G (P) received by a second inlet port from the second oxygen remover 202, from a discharge port to the absorber 3. In this embodiment, the controller 30 controls the discharge-side three-way valve 204 such that a condition in which the pretreated exhaust gas G (P) from the first oxygen remover 201 is discharged from the discharge port is switched to a condition in which the pretreated exhaust gas G (P) from the second oxygen remover 202 is discharged from the discharge port, and vice versa.

Also in this embodiment, an oxygen concentration detector 25 is provided. When an oxygen concentration in the pretreated exhaust gas G (P), which is detected by the oxygen concentration detector 25, is equal to or more than a predetermined value, the controller 30 is configured to switch one of the first oxygen remover 201 and the second oxygen remover 202 in use to the other that is unused. The controller 30 may make a message that suggests switching of one of the first oxygen remover 201 and the second oxygen remover 202 in use to the other that is unused.

In the aforementioned second embodiment, when an oxygen concentration in the pretreated exhaust gas G (P), which is detected by the oxygen concentration detector 25, is equal to or more than a predetermined value, one of the first oxygen remover 201 and the second oxygen remover 202 in use is switched to the other that is unused. Namely, when an oxygen concentration in the pretreated exhaust gas G (P) is equal to or more than a predetermined value, it is judged that the oxygen removal performance of the oxygen remover in use is deteriorated, and the oxygen remover in use can be switched to the unused one. This makes it possible to maintain the oxygen removal performance without stopping the operation, which is advantageous when a continuous operation is desired.

Although the oxygen remover 2 in this embodiment comprises the first oxygen remover 201 and the second oxygen remover 202, three or more oxygen removers may be arranged in parallel.

In this embodiment, the first remover part 211 in the first remover 201 and the second remover 221 in the second remover 202 are non-liquid deoxidizers. In this structure, it is preferable to operate the first oxygen remover 201 and the second oxygen remover 202 at a high temperature. Thus, the first remover part 201 and the second remover part 202 are preferably provided at the most upstream positions in the carbon dioxide capture system S2. A heat exchanger for cooling exhaust gas may be provided upstream of the absorber 3. In this case, the oxygen remover 2 (the first oxygen remover 201 and the second oxygen remover 202) is/are preferably provided upstream of the heat exchanger.

Third Embodiment

Next, a carbon dioxide capture system S3 according to a third embodiment is described with reference to FIG. 3.

The same reference numeral is given to a constituent element similar to those of the first and second embodiments, and its description is omitted. Only difference from the first and second embodiments is described hereunder.

An oxygen remover 2 in this embodiment differs from the first and second embodiments in that it is constituted by a counter-flow gas-liquid contactor of a packed section type. A remover part 21' therein is a packed section.

The oxygen remover 2 has an exhaust gas inlet for introducing exhaust gas G, which is located below the remover part 21', and has a solvent inlet for introducing an oxygen absorbent solvent OS, which is located above the remover part 21'. The oxygen remover 2 is configured to remove oxygen contained in the exhaust gas G by bringing the exhaust gas G and the oxygen absorbent solvent OS into gas-liquid contact to each other in the remover part 21' so that the oxygen is absorbed in the oxygen absorbent solvent OS to absorb oxygen.

The oxygen absorbent solvent OS having absorbed the oxygen in the remover part 21' falls down from the remover part 21' to be received in a liquid reservoir part 22' formed below the oxygen remover 2. The oxygen absorbent solvent OS pooled in the liquid reservoir part 22' is discharged outside from an outlet. In this embodiment, the outlet and the solvent inlet for introducing oxygen absorbent solvent OS are connected by a circulation pipe 231 including a solvent transfer pump 232. Namely, the oxygen absorbent solvent OS is circulated and used repeatedly.

On the other hand, a discharge pipe 233 is connected to a part of the circulation pipe 231 at upstream of the solvent transfer pump 232. A replenishment pipe 234 is connected to a part of the circulation pipe 231 at downstream of the solvent transfer pump 232.

The discharge pipe 233 includes a discharge control valve 233A. By opening the discharge control valve 233A, the oxygen absorbent solvent OS can be discharged outside from the circulation pipe 231. The replenishment pipe 234 is provided for correcting an oxygen concentration of oxygen contained in the oxygen absorbent solvent OS. The replenishment pipe 234 includes a replenishment control valve 234A. By opening the replenishment valve 234A, a new oxygen absorbent solvent OS for dilution can be introduced from outside into the circulation pipe 231. The discharge control valve 233A and the replenishment control valve 234A are controlled by a controller 30 but may be manually operated.

In this embodiment, a carbon dioxide absorbent solvent S, which has been used in the absorber 3, specifically, which is no longer needed, is used as the oxygen absorbent solvent OS. Whether the carbon dioxide absorbent solvent S is needed is judged as follows. For example, a carbon dioxide concentration of regenerator discharged gas containing carbon dioxide, which is discharged from the regenerator 6, is used as an indicator of performance evaluation of the carbon dioxide absorbent solvent S. The carbon dioxide absorbent solvent S, which has been used in the absorber 3 or is no longer needed, tends to have already absorbed a large amount of carbon dioxide. Thus, when it comes into contact with exhaust gas G, absorption of carbon dioxide is not enhanced, while absorption of oxygen is likely to be enhanced. Thus, an oxygen concentration in the exhaust gas G can be suitably reduced.

Figure 3:
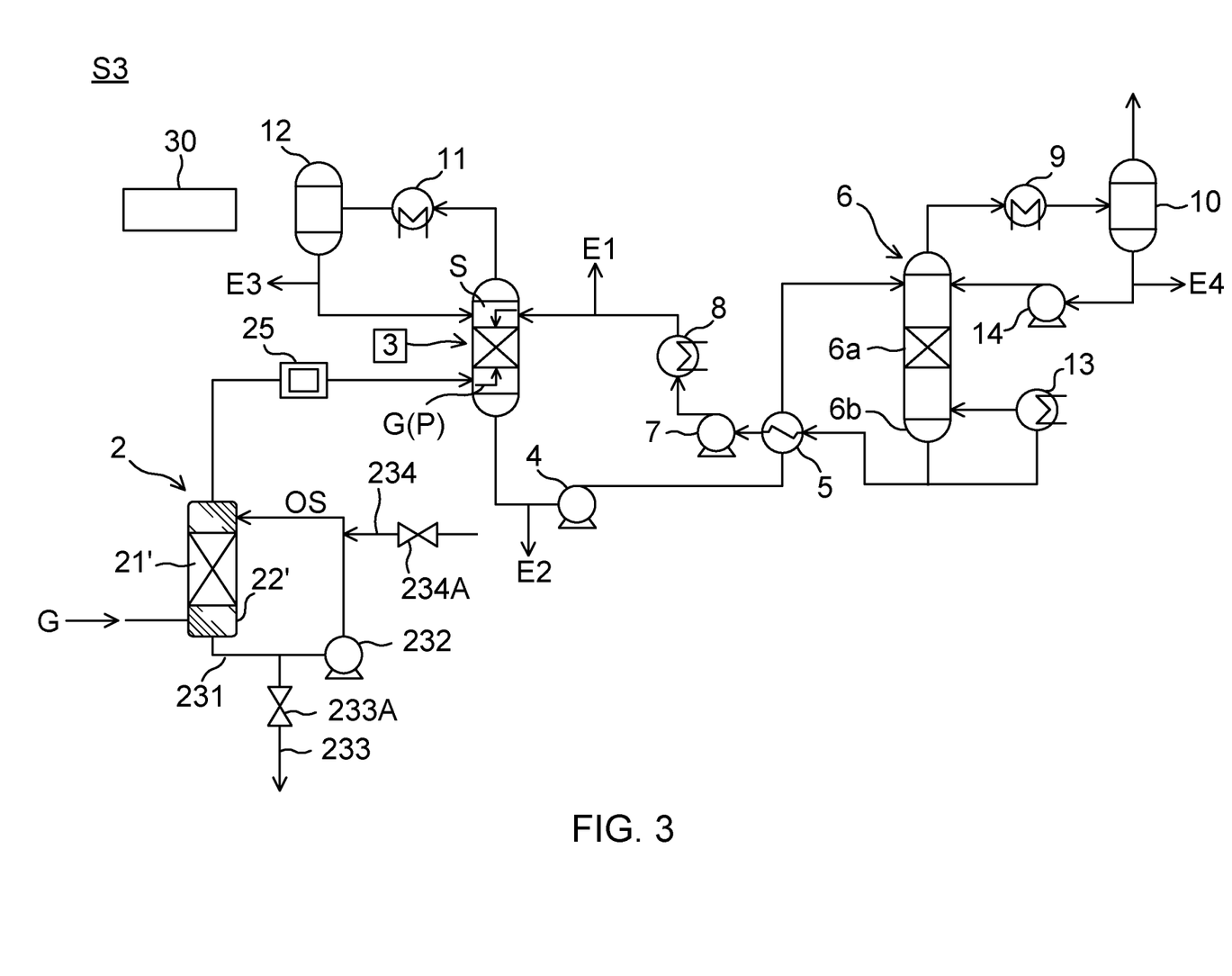
FIG. 3 is a view showing a carbon dioxide capture system according to a third embodiment.

When a carbon dioxide absorbent solvent S, which has been used in the absorber 3 or is no longer needed, is used as the oxygen absorbent solvent OS, the carbon dioxide absorbent solvent S may be drawn from a position indicated by a reference numeral E1 in FIG. 3 in a flow path through which the carbon dioxide absorbent solvent S returns from the regenerator 6 to the absorber 3, so as to introduce the carbon dioxide absorbent solvent S into the circulation pipe 231. Alternatively, the carbon dioxide absorbent solvent S may be drawn from a position indicated by a reference numeral E2 in FIG. 3 in a flow path through which the carbon dioxide absorbent solvent S flows from the absorber 3 to the regenerator 6.

In addition, the oxygen absorbent solvent OS may be absorber outlet gas condensed water or regenerator outlet gas condensed water. When the absorber outlet gas condensed water is used, the absorber outlet gas condensed water may be drawn at a position indicated by a reference numeral E3 in FIG. 3 to be introduced to the circulation pipe 231. When the regenerator outlet gas condensed water is used, the regenerator outlet gas condensed water may be drawn at a position indicated by a reference numeral E4 in FIG. 3 to be introduced to the circulation pipe 231. Needless to say, the oxygen absorbent solvent OS may be one other than a solvent used in an absorber 3, a regenerator outlet separator 10, and an absorber outlet separator 12.

Also in this embodiment, an oxygen concentration detector 25 is provided. When an oxygen concentration in the pretreated exhaust gas G (P), which is detected by the oxygen concentration detector 25, is equal to or more than a predetermined value, a controller 30 in this embodiment supplies the oxygen absorbent solvent OS, which is repeatedly used with an oxygen absorbent solvent OS for dilution. Thus, the oxygen concentration of oxygen contained in the oxygen absorbent solvent OS can be reduced.

In more detail, when an oxygen concentration in the pretreated exhaust gas G (P), which is detected by the oxygen concentration detector 25, is equal to or more than a predetermined value, the controller 30 opens the discharge control valve 233A and the replenishment control lave 234A to automatically correct the oxygen concentration in the repeatedly used oxygen absorbent solvent OS.

In this embodiment, the oxygen remover 2 brings the exhaust gas G and the oxygen absorbent solvent OS into gas-liquid contact with each other in the remover part 21' so that oxygen contained in the exhaust gas G is absorbed in the oxygen absorbent solvent OS. In this structure, a difference between a temperature at which the oxygen remover 2 is operated and a temperature at which the absorber 3 is operated is preferably small. In detail, a temperature at which the oxygen remover 2 is operated and a temperature at which the absorber 3 are preferably about the same with each other. When the oxygen absorbent solvent OS is amine or the like, it tends to decompose at a high operation temperature. From this point of view, it is not preferable that the oxygen remover 2 using the oxygen absorbent solvent OS is operated at an excessively high temperature. Thus, a heat exchanger for cooling exhaust gas may be provided upstream of the absorber 3, and the oxygen remover 2 may be provided downstream of the heat exchanger.

The aforementioned third embodiment brings the exhaust gas G and the oxygen absorbent solvent OS into gas-liquid contact with each other so that oxygen contained in the exhaust gas G is absorbed in the oxygen absorbent solvent OS. The oxygen is removed in this manner. When a non-liquid deoxidizer is used as in the first and second embodiments, cost may increases depending on a size of carbon dioxide capture system. In this case, this embodiment is advantageous in terms of cost.

In this embodiment, when an oxygen concentration in the pretreated exhaust gas G (P) is equal to or more than a predetermined value, it is judged that the oxygen removal performance of the remover part 21' in use is deteriorated, and an oxygen absorbent solvent OS for dilution is supplied to the oxygen absorbent solvent OS so as to reduce an oxygen concentration of oxygen contained in the oxygen absorbent solvent OS. This makes it possible to maintain the oxygen removal performance without stopping the operation, which is advantageous when a continuous operation is desired.

Although the oxygen remover 2 in the third embodiment is constituted by a counter-flow gas-liquid contactor of a packed section type, it may be of a shelf type, a wet scrubber type, etc. In addition, the oxygen remover 2 in the third embodiment may have a plurality of oxygen removers arranged in parallel.

Fourth Embodiment

Figure 4:
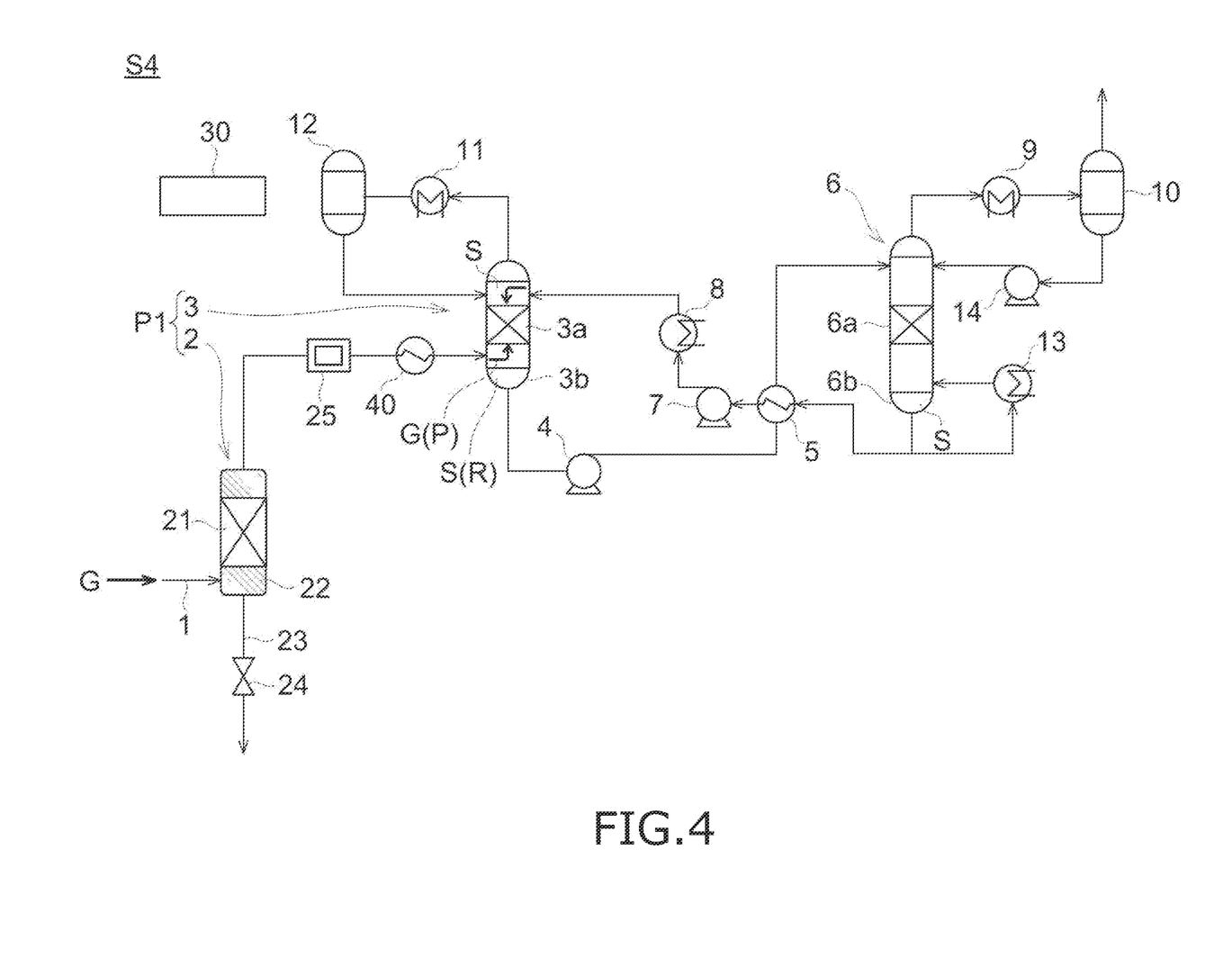
FIG. 4 is a view showing a carbon dioxide capture system according to a fourth embodiment.

Next, a carbon dioxide capture system S4 according to a fourth embodiment is described with reference to FIG. 4.

The same reference numeral is given to a constituent element similar to those of the first to third embodiments, and its description is omitted. Only difference from the first to third embodiments is described hereunder.

In this embodiment, an exhaust gas cooling heat exchanger 40 is further provided to the structure of the first embodiment. As shown in FIG. 4, the exhaust gas cooling heat exchanger 40 is provided between an oxygen remover 2 and an absorber 3. In detail, the exhaust gas cooling heat exchanger 40 is provided downstream of an oxygen concentration detector 25 in a flow path between the oxygen remover 2 and the absorber 3. However, the exhaust gas cooling heat exchanger 40 may be provided upstream of the oxygen concentration detector 25.

The exhaust gas cooling heat exchanger 40 cools pretreated exhaust gas G (P) discharged from the oxygen remover 2 by heat exchange, before the pretreated exhaust gas G (P) flows into the absorber 3. A medium introduced by the exhaust gas cooling heat exchanger 40 for the heat exchange with the pretreated exhaust gas G (P) may be a gas or a liquid. A medium introduced by the exhaust gas cooling heat exchanger 40 may be an absorber discharged gas discharged from the absorber 3. In this case, the exhaust gas cooling heat exchanger 40 may introduce an absorber discharged gas which is not yet cooled by an absorbent outlet cooler 11, or may introduce an absorber discharged gas which has been cooled by the absorber outlet cooler 11. The exhaust gas cooling heat exchanger 40 may, for example, return to the upstream side of the absorbent outlet cooler 11, or may send to an absorber outlet separator 12, an absorber discharged gas which has been heat exchanged with the pretreated exhaust gas G (P).

In this embodiment, a remover part 21 in the oxygen remover 2 is a non-liquid deoxidizer. In this structure, the oxygen remover 2 is preferably operated at a high temperature. Namely, when the remover part 21 is a non-liquid deoxidizer, oxygen separation or oxygen absorption by the remover part 21 tends to be promoted as a temperature increases. In this embodiment, since the oxygen remover 2 is provided upstream of the exhaust gas cooling heat exchanger 40, the oxygen remover 2 separates or absorbs oxygen from exhaust gas G of a high temperature, which is not yet cooled by the exhaust gas cooling heat exchanger 40. As a result, this embodiment can effectively separate or absorb oxygen by the remover part 21 from the exhaust gas G.

Fifth Embodiment

Next, a carbon dioxide capture system S5 according to a fourth embodiment is described with reference to FIG. 5.

The same reference numeral is given to a constituent element similar to those of the first to fourth embodiments, and its description is omitted. Only difference from the first to fourth embodiments is described hereunder.

In this embodiment, the exhaust gas cooling heat exchanger 40 described in the fourth embodiment is further provided to the structure of the second embodiment.

Figure 5:
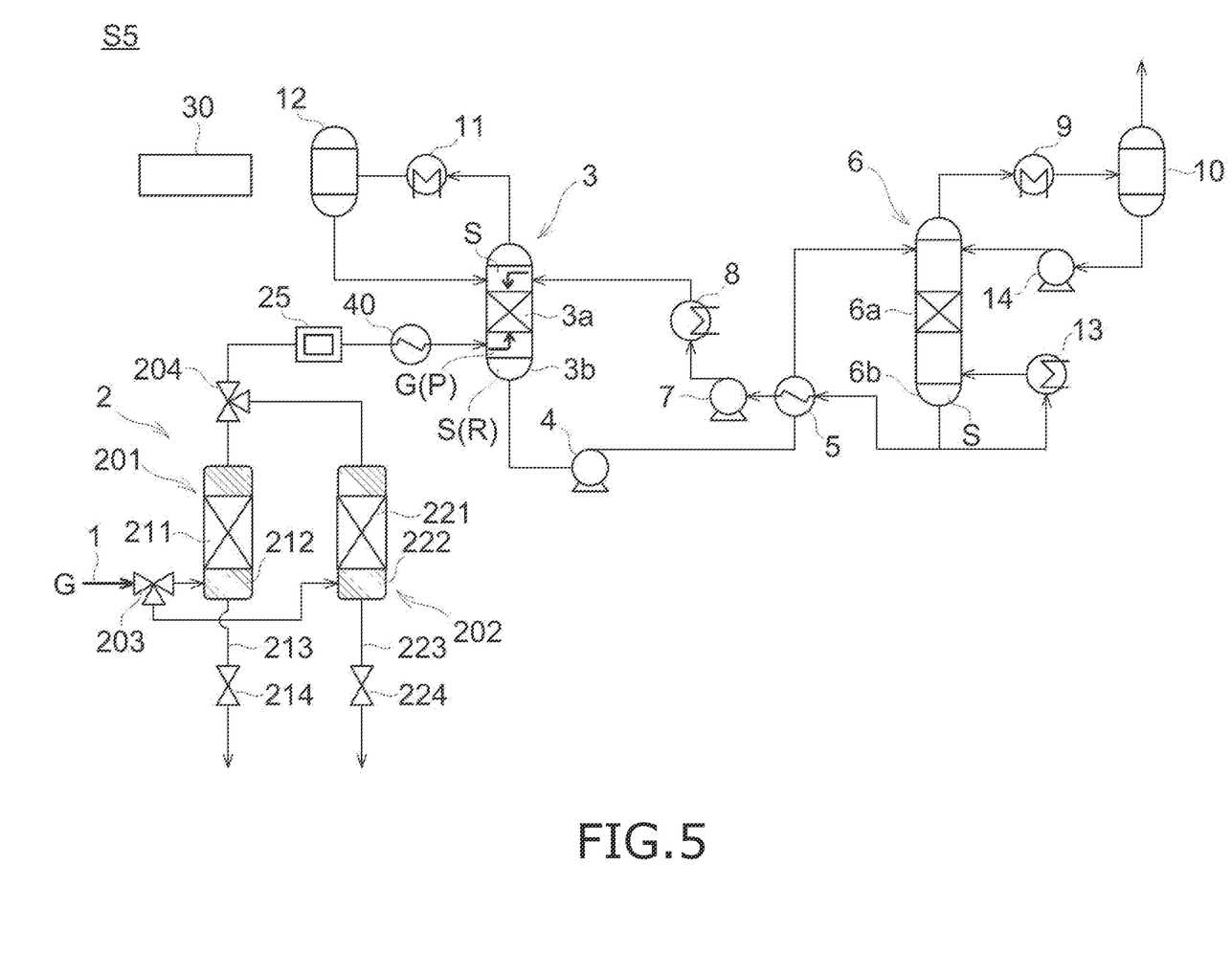
FIG. 5 is a view showing a carbon dioxide capture system according to a fifth embodiment.

As shown in FIG. 5, the exhaust gas cooling heat exchanger 40 is provided between a point where pretreated exhaust gas G (P) discharged from a first oxygen remover 201 and pretreated exhaust gas G (P) discharged from a second oxygen remover 202 merge, and an absorber 3. In detail, the exhaust gas cooling heat exchanger 40 is provided downstream of an oxygen concentration detector 25 in a flow path between a discharge-side three-way valve 204 and the absorber 3. However, the exhaust gas cooling heat exchanger 40 may be provided upstream of the oxygen concentration detector 25. Other structure of the exhaust gas cooling heat exchanger 40 is the same as that of the fourth embodiment.

Also in this embodiment, a remover part 211 in the first remover 201 and a remover part 221 in the second oxygen remover 202 are non-liquid deoxidizers. In this structure, it is preferable to operate the first oxygen remover 201 and the second oxygen remover 202 at a high temperature. Namely, when the remover parts 211, 221 are non-liquid deoxidizers, oxygen separation or oxygen absorption by the remover parts 211, 221 tends to be promoted as a temperature increases. In this embodiment, since the first oxygen remover 201 and the second oxygen remover 202 are provided upstream of the exhaust gas cooling heat exchanger 40, the first oxygen remover 201 and the second oxygen remover 202 separate or absorb oxygen from exhaust gas G of a high temperature, which is not yet cooled by the exhaust gas cooling heat exchanger 40. As a result, this embodiment can also effectively separate or absorb oxygen by the remover parts 211, 221 from the exhaust gas G.

Sixth Embodiment

Next, a carbon dioxide capture system S6 according to a sixth embodiment is described with reference to FIG. 6.

The same reference numeral is given to a constituent element similar to those of the first to fifth embodiments, and its description is omitted. Only difference from the first to fifth embodiments is described hereunder.

In this embodiment, the exhaust gas cooling heat exchanger 40 described in the fourth embodiment is further provided to the structure of the third embodiment. However, a position of the exhaust gas cooling heat exchanger 40 differs from that of the fourth embodiment.

Figure 6:
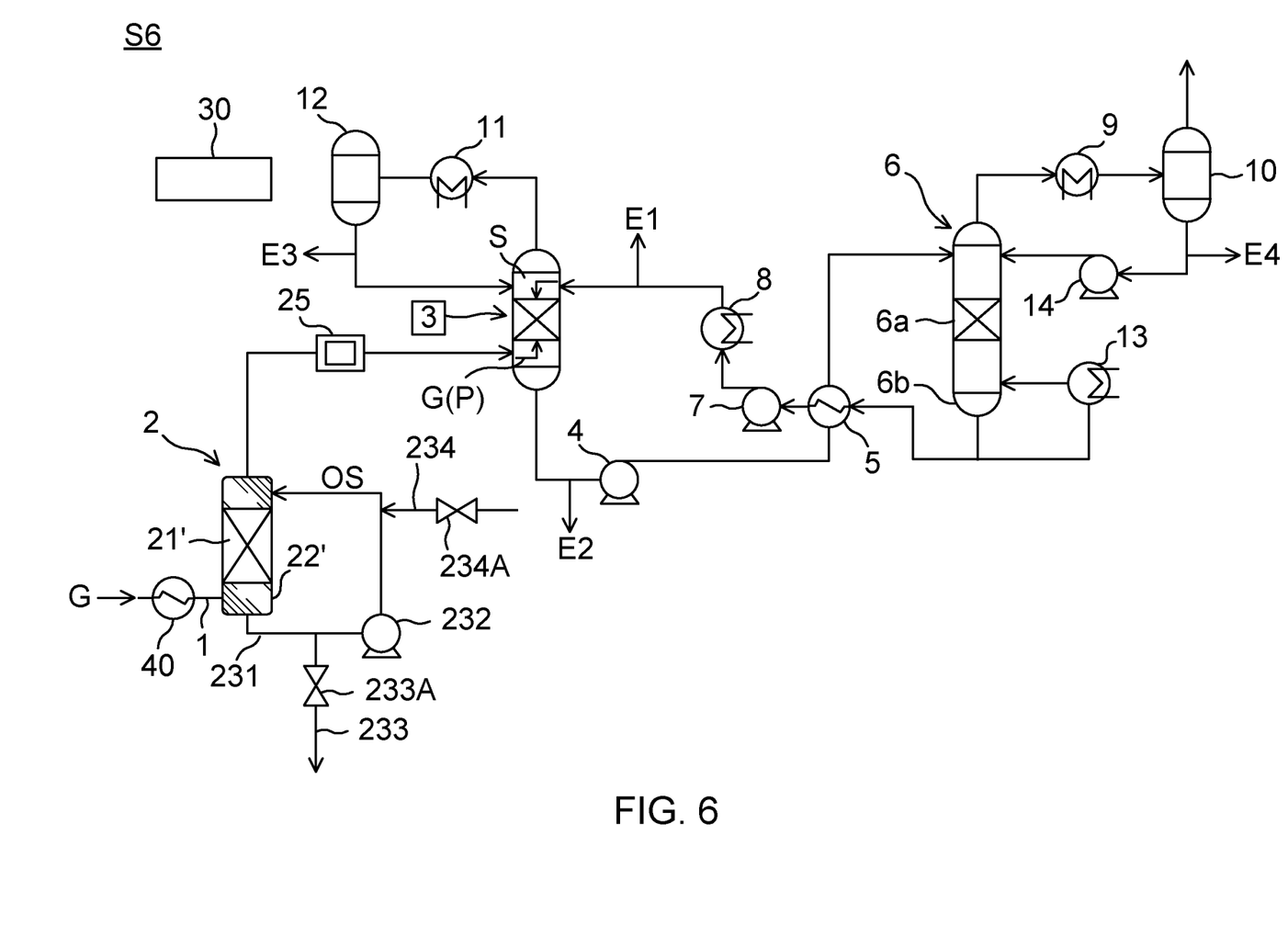
FIG. 6 is a view showing a carbon dioxide capture system according to a sixth embodiment.

Namely, as shown in FIG. 6, the exhaust gas cooling heat exchanger 40 is provided upstream of an oxygen remover 2. In detail, the exhaust gas cooling heat exchanger 40 is provided at a position upstream of the oxygen remover 2 in an exhaust gas line 1. The exhaust gas cooling heat exchanger 40 in this embodiment cools exhaust gas G flowing through the exhaust gas line 1 by heat exchange, before the exhaust gas G flows into the oxygen remover 2. A medium introduced by the exhaust gas cooling heat exchanger 40 for the heat exchange with the exhaust gas G may be a gas or a liquid. A medium introduced by the exhaust gas cooling heat exchanger 40 may be an absorber discharged gas discharged from an absorber 3. In this case, the exhaust gas cooling heat exchanger 40 may introduce an absorber discharged gas which is not yet cooled by an absorbent outlet cooler 11, or may introduce an absorber discharged gas which has been cooled by the absorber outlet cooler 11. The exhaust gas cooling heat exchanger 40 may, for example, return to the upstream side of the absorbent outlet cooler 11, or send to an absorber outlet separator 12, an absorber discharged gas which has been heat exchanged with the exhaust gas G.

In this embodiment, the oxygen remover 2 brings the exhaust gas G and an oxygen absorbent solvent OS into gas-liquid contact with each other in a remover part 21' so that oxygen contained in the exhaust gas G is absorbed in the oxygen absorbent solvent OS. In this structure, a difference between a temperature at which the oxygen remover 2 is operated and a temperature at which the absorber 3 is operated is preferably small. In detail, a temperature at which the oxygen remover 2 is operated and a temperature at which the absorber 3 are preferably about the same with each other. When the oxygen absorbent solvent OS is amine or the like, it tends to decompose at a high operation temperature. From this point of view, it is not preferable that the oxygen remover 2 using the oxygen absorbent solvent OS is operated at an excessively high temperature. The exhaust gas cooling heat exchanger 40 in this embodiment cools exhaust gas G by heat exchange, before the exhaust gas G flows into the oxygen remover 2. This can effectively suppress progress of decomposition of the oxygen absorbent solvent OS.

Seventh Embodiment

Figure 7:
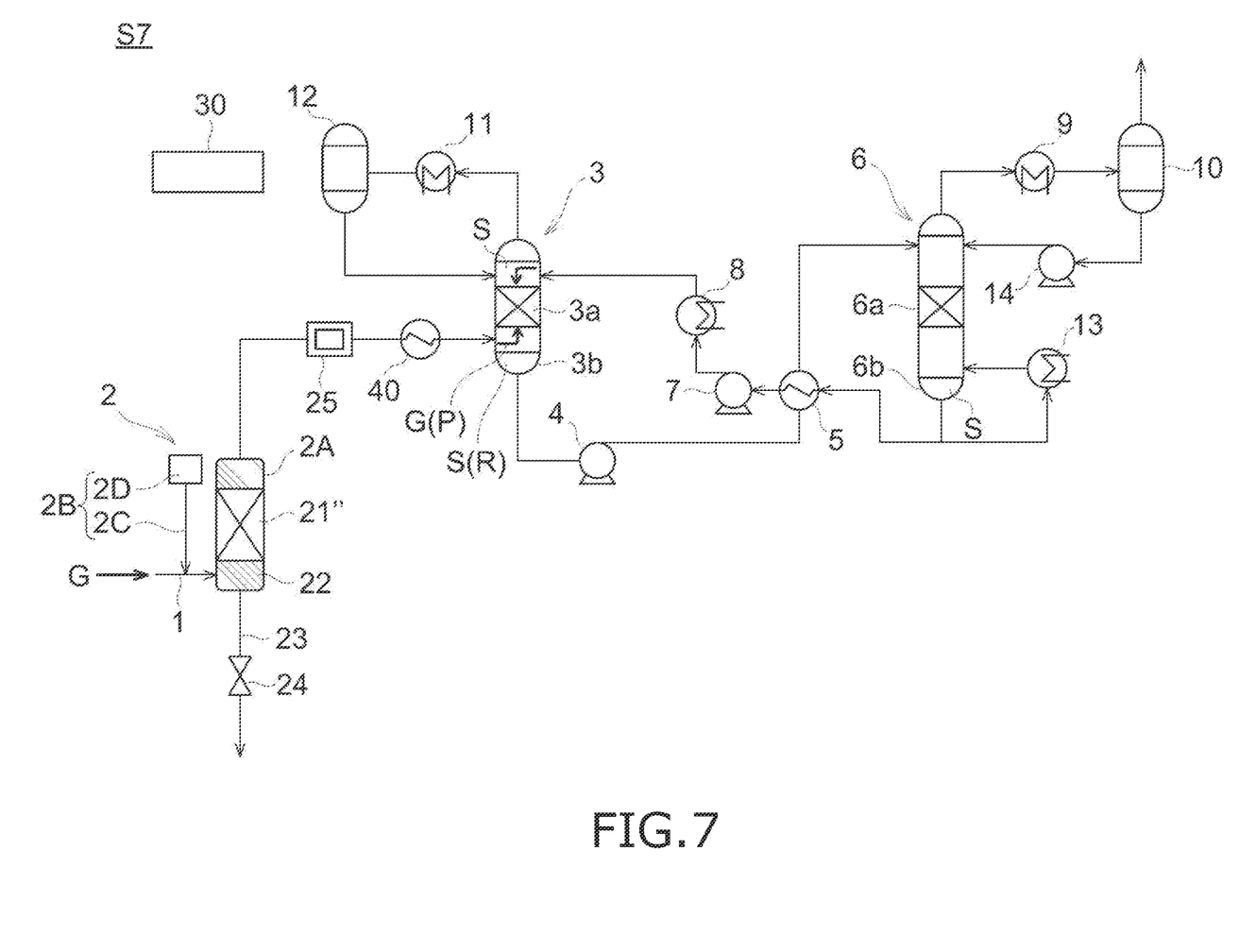
FIG. 7 is a view showing a carbon dioxide capture system according to a seventh embodiment.

Next, a carbon dioxide capture system S7 according to a seventh embodiment is described with reference to FIG. 7.

The same reference numeral is given to a constituent element similar to those of the first to sixth embodiments, and its description is omitted. Only difference from the first to sixth embodiments is described hereunder.

In this embodiment, the exhaust gas cooling heat exchanger 40 is further provided to the structure of the first embodiment, while a structure of an oxygen remover 2 differs from that of the first embodiment. Since the position and the function of the exhaust gas cooling heat exchanger 40 are the same as those of FIG. 4 (fourth embodiment), description thereof is omitted.

The oxygen remover 2 in this embodiment comprises a remover body 2A including a remover part 21" and a liquid reservoir part 22 located below the remover part 21", and a hydrogen gas supply unit 2B that supplies a hydrogen gas to exhaust gas G before the exhaust gas G flows into the remover part 212". The hydrogen gas supply unit 2B includes a hydrogen gas supply path 2C through which a hydrogen gas flows, and a hydrogen gas source 2D that stores a hydrogen gas. The hydrogen gas supply unit 2B supplies a hydrogen gas, which flows from the hydrogen gas source 2D through the hydrogen gas supply path 2C, to exhaust gas G before it flows into the remover part 21".

In this embodiment, the hydrogen gas supply path 2C is connected to a position upstream of the remover body 2A in an exhaust gas line 1, but the hydrogen gas supply path 2C may be directly connected to the remover body 2A. The hydrogen gas source 2D may be constituted by a hydrogen tank, for example.

The oxygen remover 2 removes oxygen from the exhaust gas G by mixing the hydrogen gas from the hydrogen gas supply path 2C with the exhaust gas G and then by passing the mixture through the remover part 21", so as to reduce an oxygen concentration in the exhaust gas G. In this embodiment, the remover part 21" includes a metal catalyst that reacts the oxygen contained in the exhaust gas G and hydrogen contained in the hydrogen gas. The metal catalyst in the remover part 21" is configured to remove the oxygen contained in the exhaust gas G by chemically reaction between the oxygen and the hydrogen.

The remover part 21" may contain platinum as the metal catalyst, for example. Alternatively, the remover part 21" may contain a platinum-based alloy as the metal catalyst, or may contain a catalyst made of other materials. The metal catalyst may have a granular shape (aggregation of grains), a honeycomb shape, a porous shape, or a combination of at least two of these shapes. The shape of the catalyst may be of another type, as long as a pressure loss when exhaust gas is introduced into the oxygen remover 2 can be ensured within an appropriate range.

In addition, the remover part 21" in this embodiment is detachable from the oxygen remover 2, in detail, from the remover body 2A. Thus, the remover part 21" can be replaced in response to a metal catalyst performance deterioration, for example.

In the aforementioned embodiment, in a gas processing equipment comprising the oxygen remover 2 and the absorber 3, oxygen and hydrogen contained in exhaust gas G are first chemically reacted by the metal catalyst in the remover part 21". Then, water is generated to remove oxygen from the exhaust gas G, so that an oxygen concentration in the exhaust gas G reduces. Thereafter, the pre-treated exhaust gas G (P) from which the oxygen has been removed is sent to the absorber 3, and carbon dioxide is separated therefrom by a carbon dioxide absorbent solvent S. Thus, mixture of oxygen into the carbon dioxide absorbent solvent 5, which is a treatment agent that performs processing of separating carbon dioxide from exhaust gas, can be suppressed, and thus the performance of the carbon dioxide absorbent solvent S can be well maintained. Namely, since the mixture of oxygen into the carbon dioxide absorbent solvent S is suppressed so that there is no or little possibility that oxidative decomposition occurs, the performance of the carbon dioxide absorbent solvent S can be well maintained.

In this embodiment, the oxygen remover 2 is preferably operated at a high temperature. Oxygen separation or oxygen absorption by the remover part 21" using a metal catalyst tends to be promoted as a temperature increases. In this embodiment, since the oxygen remover 2 is provided upstream of the exhaust gas cooling heat exchanger 40, the oxygen remover 2 separates or absorbs oxygen from exhaust gas G of a high temperature, which is not yet cooled by the exhaust gas cooling heat exchanger 40. As a result, this embodiment can effectively separate or absorb oxygen by the remover part 21" from the exhaust gas G.

As a modification example, the remover part 21" including a metal catalyst may be omitted from the oxygen remover 2. Namely, it is possible to employ a structure in which oxygen is removed from exhaust gas G by mixing oxygen contained in exhaust gas G and a hydrogen gas from the hydrogen gas supply unit 2B so as to chemically react the oxygen and the hydrogen. Oxygen and hydrogen may chemically react without a catalyst, depending on temperature and pressure conditions. This structure may be efficiently used when exhaust gas G has a high temperature.

Eighth Embodiment

Figure 8:
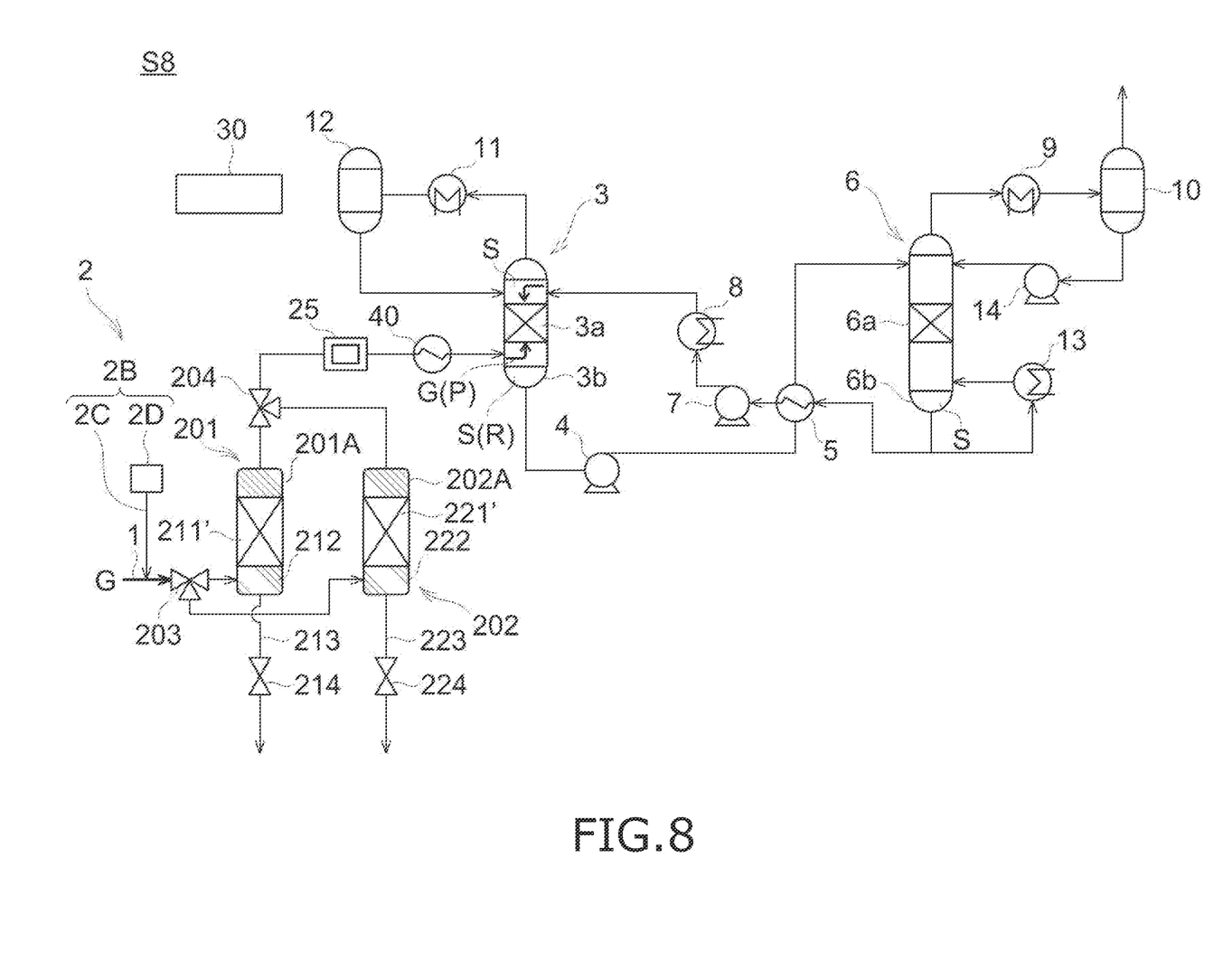
FIG. 8 is a view showing a carbon dioxide capture system according to an eighth embodiment.

Next, a carbon dioxide capture system S8 according to an eighth embodiment is described with reference to FIG. 8.

The same reference numeral is given to a constituent element similar to those of the first to seventh embodiments, and its description is omitted. Only difference from the first to seventh embodiments is described hereunder.

In this embodiment, the exhaust gas cooling heat exchanger 40 is further provided to the structure of the second embodiment, while a structure of an oxygen remover 2 differs from that of the second embodiment. Since the position and the function of the exhaust gas cooling heat exchanger 40 are the same as those of FIG. 5 (fifth embodiment), description thereof is omitted.

The oxygen remover 2 in this embodiment further comprises the hydrogen gas supply unit 2B described in the seventh embodiment. In detail, the oxygen remover 2 comprises a first oxygen remover 201, a second oxygen remover 202, and the hydrogen gas supply unit 2B. The first oxygen remover 201 includes a remover body 201A including a remover part 211' and a liquid reservoir part 212 located below the remover part 211'. The second oxygen remover 202 includes a remover body 202A including a remover part 221' and a liquid reservoir part 222 located below the remover part 221'.

A hydrogen gas supply path 2C of the hydrogen gas supply unit 2B is connected to a poison upstream of a supply-side three-way valve 203 in an exhaust gas line 1. Namely, the hydrogen gas supply path 2C supplies a hydrogen gas to exhaust gas G before the supply-side three-way valve 203 distributes the hydrogen gas G to the first oxygen remover 201 and the second oxygen remover 202.

The aforementioned embodiment provides the same effect as that of the seventh embodiment.

While certain embodiments have been described, these embodiments have been presented by way of example only, and are not intended to limit the scope of the inventions. Indeed, the novel systems and methods described herein may be embodied in a variety of other forms; furthermore, various omissions, substitutions and changes in the form of the systems and methods described herein may be made without departing from the spirit of the inventions. The accompanying claims and their equivalents are intended to cover such forms or modifications as would fall within the scope and spirit of the inventions.

For example, in this embodiment, the absorber 3 uses the carbon dioxide absorbent solvent to remove carbon dioxide. However, the absorber 3 may have another structure such as a carbon dioxide absorption membrane. Also in this case, the oxygen remover 2 described in the respective aforementioned embodiments can efficiently function.

What is claimed is:

1. A gas processing equipment comprising:
   an oxygen remover that removes oxygen contained in exhaust gas; and
   a gas processing device that processes pretreated exhaust gas, from which the oxygen has been removed by the oxygen remover, with a treatment agent, wherein
   the oxygen remover removes the oxygen contained in the exhaust gas by bringing the exhaust gas and an oxygen absorbent solvent into contact with each other so that the oxygen is absorbed in the oxygen absorbent solvent.

2. The gas processing equipment according to claim 1, wherein
   the oxygen remover reduces an oxygen concentration in the exhaust gas.

3. The gas processing equipment according to claim 1, wherein
   the oxygen absorbent solvent has absorbed carbon dioxide.

4. The gas processing equipment according to claim 1, wherein
   the oxygen absorbent solvent contains at least one of an amine solution, a silicone oil, and an ionic liquid.

5. The gas processing equipment according to claim 1, further comprising a heat exchanger located upstream of the oxygen remover, the heat exchanger being configured to cool the exhaust gas.

6. A gas processing equipment comprising:
   an oxygen remover that removes oxygen contained in exhaust gas; and
   a gas processing device that processes pretreated exhaust gas, from which the oxygen has been removed by the oxygen remover, with a treatment agent, wherein
   the oxygen remover removes the oxygen by passing the exhaust gas through a non-liquid deoxidizer.

7. The gas processing equipment according to claim 6, wherein
   the deoxidizer contains at least one of iron, copper, lead, silver, zeolite, and activated carbon.

8. The gas processing equipment according to claim 6, wherein
   the deoxidizer has a granular shape, a honeycomb shape, a porous shape, or a combination of at least two of these shapes.

9. The gas processing equipment according to claim 6, further comprising a heat exchanger provided between the oxygen remover and the gas processing device, the heat exchanger being configured to cool the exhaust gas.

10. A gas processing equipment comprising:
    an oxygen remover that removes oxygen contained in exhaust gas; and
    a gas processing device that processes pretreated exhaust gas, from which the oxygen has been removed by the oxygen remover, with a treatment agent, wherein
    the gas processing device is an absorber that separates carbon dioxide from the pretreated exhaust gas by bringing a carbon dioxide absorbent solvent as the treatment agent and the pretreated exhaust gas into contact with each other so that the carbon dioxide contained in the pretreated exhaust gas is absorbed in the carbon dioxide absorbent solvent,
    the oxygen remover removes the oxygen contained in the exhaust gas by bringing the exhaust gas and an oxygen absorbent solvent into contact with each other so that the oxygen is absorbed in the oxygen absorbent solvent, and
    the oxygen remover uses, as the oxygen absorbent solvent, the carbon dioxide absorbent solvent that has been used in the gas processing device.

11. A gas processing equipment comprising:
    an oxygen remover that removes oxygen contained in exhaust gas;
    a gas processing device that processes pretreated exhaust gas, from which the oxygen has been removed by the oxygen remover, with a treatment agent; and
    an oxygen concentration detector that detects an oxygen concentration in the pretreated exhaust gas that flows through a flow path between the oxygen remover and the gas processing device.

12. The gas processing equipment according to claim 11, wherein
    the oxygen remover comprises a plurality of oxygen removers that are arranged in parallel, and
    when an oxygen concentration detected by the oxygen concentration detector is equal to or more than a predetermined value, one or more of the oxygen removers in use is switched to an unused oxygen remover, or a message that suggests switching of one or more of the oxygen removers in use to an unused oxygen remover is made.

13. The gas processing equipment according to claim 11, wherein
the oxygen remover removes the oxygen contained in the exhaust gas by bringing the exhaust gas and an oxygen absorbent solvent into contact with each other so that the oxygen is absorbed in the oxygen absorbent solvent, and circulates the oxygen absorbent solvent for repeated use, and
when an oxygen concentration detected by the oxygen concentration detector is equal to or more than a predetermined value, an oxygen absorbent solvent for dilution is supplied to the oxygen absorbent solution so that the oxygen concentration of oxygen contained in the oxygen absorbent solvent is reduced.

14. A gas processing equipment comprising:
an oxygen remover that removes oxygen contained in exhaust gas; and
a gas processing device that processes pretreated exhaust gas, from which the oxygen has been removed by the oxygen remover, with a treatment agent, wherein
the oxygen remover includes a hydrogen gas supply unit that supplies a hydrogen gas to the exhaust gas, and
the oxygen remover removes the oxygen from the exhaust gas by mixing the hydrogen gas from the hydrogen gas supply unit with the exhaust gas to chemically react the oxygen contained in the exhaust gas and hydrogen contained in the hydrogen gas.

15. The gas processing equipment according to claim 14, wherein
the oxygen remover has a remover part including a metal catalyst, and
the oxygen remover chemically reacts the oxygen contained in the exhaust gas and the hydrogen contained in the hydrogen gas, with the metal catalyst in the remover part.

16. A gas processing method by using the gas processing equipment according to claim 1, comprising:
an oxygen removal step that removes oxygen contained in exhaust gas by using the oxygen remover; and
a gas processing step that processes pretreated exhaust gas, from which the oxygen has been removed by the oxygen removal step, with a treatment agent, by using the gas processing device.

17. A carbon dioxide capture system comprising:
the gas processing equipment according to claim 1; and
a regenerator, wherein
the gas processing device is an absorber that separates carbon dioxide from the pretreated exhaust gas by bringing a carbon dioxide absorbent solvent as the treatment agent and the pretreated exhaust gas into contact with each other so that the carbon dioxide contained in the pretreated exhaust gas is absorbed in the carbon dioxide absorbent solvent; and
the regenerator diffuses the carbon dioxide from the carbon dioxide absorbent solvent discharged from the absorber, and discharges the carbon dioxide absorbent solvent, which has diffused the carbon dioxide, and the regenerator discharged gas containing the carbon dioxide.

18. The carbon dioxide capture system according to claim 17, wherein
the absorber brings the carbon dioxide absorbent solvent discharged from the regenerator into contact with the pretreated exhaust gas.

19. A carbon dioxide capture method by using the carbon dioxide capture system according to claim 17, comprising:
an oxygen removal step that removes oxygen contained in exhaust gas by using the oxygen remover; and
an absorption step that separates carbon dioxide from pretreated exhaust gas, from which the oxygen has been removed by the oxygen removal step, by bringing a carbon dioxide absorbent solvent and the pretreated exhaust gas into contact with each other so that the carbon dioxide contained in the pretreated exhaust gas is absorbed in the carbon dioxide absorbent solvent, by using the absorber; and
a regeneration step that diffuses the carbon dioxide from the carbon dioxide absorbent solvent that has absorbed the carbon dioxide in the absorption step, and discharges the carbon dioxide absorbent solvent, which has diffused the carbon dioxide, and a regenerator discharged gas containing the carbon dioxide, by using the regenerator.

* * * * *